(12) United States Patent
Hasegawa et al.

(10) Patent No.: US 12,182,463 B2
(45) Date of Patent: *Dec. 31, 2024

(54) IMAGE FORMING APPARATUS, CONTROL METHOD OF IMAGE FORMING APPARATUS AND IMAGE FORMING SYSTEM

(71) Applicant: SHARP KABUSHIKI KAISHA, Osaka (JP)

(72) Inventors: Kazunori Hasegawa, Osaka (JP); Satoshi Awata, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/505,486

(22) Filed: Nov. 9, 2023

(65) Prior Publication Data

US 2024/0069836 A1 Feb. 29, 2024

Related U.S. Application Data

(63) Continuation of application No. 17/872,592, filed on Jul. 25, 2022, now Pat. No. 11,847,370, which is a (Continued)

(30) Foreign Application Priority Data

Sep. 3, 2020 (JP) ................................ 2020-147989
Sep. 7, 2020 (JP) ................................ 2020-149880

(51) Int. Cl.
*G06F 3/12* (2006.01)
(52) U.S. Cl.
CPC ............ *G06F 3/126* (2013.01); *G06F 3/1204* (2013.01)

(58) Field of Classification Search
None
See application file for complete search history.

(56) References Cited

U.S. PATENT DOCUMENTS 7,768,666 B2 * 8/2010 Okamoto .............. G06F 3/1226
358/1.15
8,144,351 B2  3/2012  Sato
(Continued)

FOREIGN PATENT DOCUMENTS

CN        102685349 A    9/2012
JP        2004-237469 A  8/2004
(Continued)

OTHER PUBLICATIONS

Notice of Allowance and Fee(s) Due issued on May 2, 2022 for U.S. Appl. No. 17/412,108.
(Continued)

*Primary Examiner* — Frantz Bataille
(74) *Attorney, Agent, or Firm* — ScienBiziP, P.C.

(57) ABSTRACT

An image forming system includes a plurality of image forming apparatuses and an information processing apparatus, and the plurality of image forming apparatuses include a parent apparatus and a child apparatus(es). The parent apparatus transmits, when receiving a print instruction that is transmitted from the child apparatus for outputting operated by a user, print data to the child apparatus for outputting. The parent apparatus transmits, when transmission instruction data is included in the print data, print image data included in the print data to a transmission destination apparatus such as a child apparatus other than the child apparatus for outputting, the information processing apparatus and a further external apparatus with which the parent apparatus can perform communication via a network.

8 Claims, 13 Drawing Sheets

Related U.S. Application Data continuation of application No. 17/412,108, filed on Aug. 25, 2021, now Pat. No. 11,435,967.

(56) References Cited

U.S. PATENT DOCUMENTS

| | | | |
|---|---|---|---|
| 8,559,024 B2 * | 10/2013 | Imai | H04N 1/00222 |
| | | | 358/1.11 |
| 11,435,967 B2 * | 9/2022 | Hasegawa | G06F 3/1291 |
| 2002/0057455 A1 * | 5/2002 | Gotoh | G06F 3/1207 |
| | | | 358/1.15 |
| 2007/0070401 A1 | 3/2007 | Okamoto et al. | |
| 2008/0204799 A1 | 8/2008 | Sato | |
| 2012/0229835 A1 | 9/2012 | Tawada | |
| 2022/0066709 A1 | 3/2022 | Hasegawa et al. | |

FOREIGN PATENT DOCUMENTS

| | | |
|---|---|---|
| JP | 2013-121114 A | 6/2013 |
| JP | 2018-190146 A | 11/2018 |
| JP | 2022-042566 A | 3/2022 |

OTHER PUBLICATIONS

Machine translation of Japanese Patent Application No. 2018-190146 to Tomita, published on Nov. 29, 2018.
Non-Final Rejection dated Mar. 16, 2023 for U.S. Appl. No. 17/872,592.
Notice of Allowance of U.S. Appl. No. 17/872,592 issued on Aug. 3, 2023.

* cited by examiner

PRINT DATA SELECTION SCREEN 140

DESTINATION INFORMATION TABLE

| ID | ADDRESS |
|---|---|
| 0001 | 111@.com |
| 0002 | 222@.com |
| 0003 | 333@.com |
| 0004 | 444@.com |
| 0005 | 555@.com |
| 0006 | 666@.com |
| ... | ... |

IMAGE FORMING APPARATUS, CONTROL METHOD OF IMAGE FORMING APPARATUS AND IMAGE FORMING SYSTEM

CROSS REFERENCE OF RELATED APPLICATION

This application is a continuation of U.S. patent application Ser. No. 17/872,592, filed on Jul. 25, 2022, which is a continuation of U.S. patent application Ser. No. 17/412,108, filed on Aug. 25, 2021, which claims priorities to Japanese Patent Application No. 2020-147989 filed on Sep. 3, 2020 and Japanese Patent Application No. 2020-149880 filed on Sep. 7, 2020, and the entire contents of which are incorporated herein by reference.

BACKGROUND OF THE INVENTION

Field of the Invention

The present invention relates to an image forming apparatus, a control method of image forming apparatus and an image forming system, and more specifically, to an image forming apparatus, a control method of image forming apparatus and an image forming system, in which a plurality of image forming apparatuses are included and a user can perform print processing with a desired image forming apparatus.

Related Arts

An example of such a kind of related art is disclosed in Japanese Patent Application Laying-open No. 2018-190146. This print system is provided with a print instruction apparatus that receives a print instruction from a user, a document storing apparatus capable of storing temporarily document data based on the print instruction and a plurality of image forming apparatuses capable of printing a document based on the document data. After issuing the print instruction, the user can use a desired image forming apparatus to print the document data.

In such a print system, a print image transmission service for transmitting print image data used in the print processing to an external apparatus is desired.

However, in the print system of the related art, it is impossible to execute a print image transmission service, and therefore, there is a room for improvement from the viewpoint of convenience.

SUMMARY OF THE INVENTION

Therefore, it is a primary object of the present invention to provide a novel image forming apparatus, control method of image forming apparatus and image forming system.

It is another object of the present invention to provide an image forming apparatus, control method of image forming apparatus and image forming system, capable of improving convenience for user.

A first embodiment is an image forming apparatus, comprising: a receiver; a storer; a determiner; a first transmitter; and a second transmitter. The receiver receives print data transmitted from an external apparatus. The storer stores destination information data of a predetermined transmission destination apparatus and the print data received by the receiver. The determiner determines, when receiving a print instruction for the print data from a further image forming apparatus, whether transmission instruction data to the transmission destination apparatus is included in the print data. The first transmitter transmits the print data to the further image forming apparatus when receiving the print instruction for the print data. The second transmitter transmits print image data included in the print data to the transmission destination apparatus when the determiner determines that the transmission instruction data is included in the print data.

A second embodiment is the image forming apparatus according to the first embodiment, further comprising a deleter that deletes the transmission instruction data from the print data when the determiner determines that the transmission instruction data is included in the print data, wherein the first transmitter transmits the print data from which the transmission instruction data is deleted by the deleter to the further image forming apparatus.

A third embodiment is the image forming apparatus according to the first embodiment, further comprising a notifyer that notifies a transmission result to the further image forming apparatus when the second transmitter transmits the print image data to the transmission destination apparatus.

A fourth embodiment is a control method that a computer of an image forming apparatus comprising a storage that stores destination information data of a predetermined transmission destination apparatus, executing: receiving print data transmitted from an external apparatus; storing the print data in the storage; determining, when receiving a print instruction for the print data from a further image forming apparatus, whether transmission instruction data to a transmission destination apparatus is included in the print data; transmitting the print data to the further image forming apparatus when receiving the print instruction for the printing data; and transmitting print image data included in the print data to the transmission destination apparatus when determining that the transmission instruction data is included in the print data.

A fifth embodiment is an image forming system in which a plurality of image forming apparatuses including a first image forming apparatus and a second image forming apparatus are connected to each other in a communicable manner, wherein the first image forming apparatus comprises: a first image forming unit that forms an image on a recording medium; a first communication unit capable of receiving print data transmitted from a first external apparatus; a storing unit that stores the print data received by the first communication unit and destination information of a second external apparatus; a first transmission determination unit that determines whether the print data includes a transmission instruction to the second external apparatus; and a first communication control unit that controls an operation of the first communication unit, wherein the first communication control unit controls the first communication unit so that the print data is transmitted to the second image forming apparatus in response to a request from the second image forming apparatus, and when the transmission instruction to the second external apparatus is included in the print data, the print data to which destination information of the second external apparatus is added is transmitted to the second image forming apparatus, wherein the second image forming apparatus comprises: a second communication unit capable of receiving the print data transmitted from the first image forming apparatus; a second image forming unit that forms an image on a recording medium based on the print data received by the second communication unit; a second transmission determination unit that determines whether the print data includes a transmission instruction to the second external apparatus; and a second communication control unit that controls an operation of the second communication unit, wherein the second communication control unit controls the second communication unit so that print image data based on the print data is transmitted to the second external apparatus by utilizing the destination information added to the print data when the transmission instruction to the second external apparatus is included in the print data.

A sixth embodiment is the image forming system according to the fifth embodiment, wherein the second communication control unit controls the second communication unit so that a transmission result is transmitted to the first image forming apparatus when transmitting the print image data to the second external apparatus, and the storing unit stores the transmission result transmitted from the second image forming apparatus.

According to the present invention, it is possible to improve convenience for the user.

The above described objects and other objects, features, aspects and advantages of the present invention will become more apparent from the following detailed description when taken in conjunction with the accompanying drawings.

DETAILED DESCRIPTION OF THE PREFERRED EMBODIMENTS

First Embodiment

Figure 1:
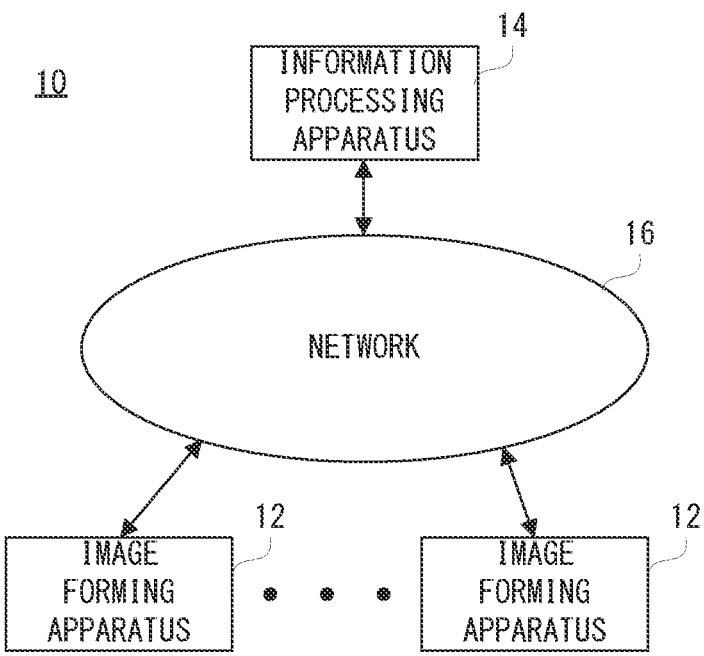
FIG. 1 is an illustration view showing an example of a configuration of an image forming system according to the present invention.

FIG. 1 is an illustration view showing an example of a configuration of an image forming system 10 according to the present invention. With reference to FIG. 1, the image forming system 10 that is the first embodiment according to the present invention includes a plurality of image forming apparatuses 12 and an information processing apparatus 14. Each of the plurality of image forming apparatuses 12 is connected with other image forming apparatus(es) 12 and the information processing apparatus 14 communicably via a network 16 such as an internet or LAN. In addition, although an example of the image forming system 10 shown in FIG. 1 has a single information processing apparatus 14 is connected on the network 16, two or more information processing apparatuses 14 may be connected. Moreover, although illustration is omitted, each of the plurality of image forming apparatuses 12 is connected also to a facsimile communication network such as a PSTN (Public Switched Telephone Networks) and an IP network.

The information processing apparatus 14 shown in FIG. 1 is a general-purpose computer (user terminal) that a user of the image forming system 10 uses. For example, the information processing apparatus 14 may be a smartphone, desktop PC, note (laptop) PC, tablet PC, etc.

Figure 2:
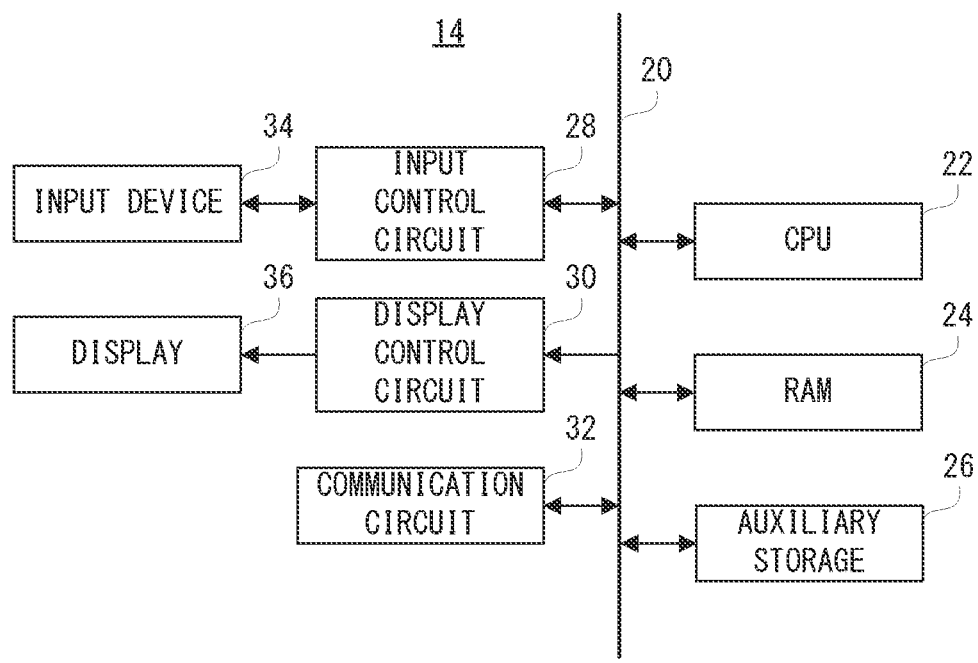
FIG. 2 is a block diagram showing electric structure of an information processing apparatus shown in FIG. 1.

FIG. 2 is a block diagram showing electric structure of the information processing apparatus 14 shown in FIG. 1. With reference to FIG. 2, the information processing apparatus 14 of the first embodiment includes a CPU 22. The CPU 22 is connected, via a bus 20, with a RAM 24, an auxiliary storage 26, an input control circuit 28, a display control circuit 30 and a communication circuit 32. Moreover, the input control circuit 28 is connected with an input device 34, and a display 36 is connected to the display control circuit 30.

As the display 36, an LCD or EL (Electro-Luminescence) display may be used. The same is applied also to a display 72 described later.

The CPU 22 is in charge of overall control of the information processing apparatus 14. The RAM 24 is used as a working area and a buffer area for the CPU 22.

The auxiliary storage 26 is an HDD (hard disc drive), for example, and is an auxiliary memory that stores a control program for controlling, by the CPU 22, operations of respective components of the information processing apparatus 14, various kinds of data, etc. However, as the auxiliary storage 26, another nonvolatile memory such as an SSD, a flash memory and an EEPROM may be used instead of the HDD or together with the HDD. The same is applied also to an auxiliary storage 56 described later.

The input device 34 is a device for receiving an input operation of the user (user operation), and includes, for example, a touch panel, a keyboard, a computer mouse, etc. When the input device 34 is a keyboard, the input device 34 includes hardware operating buttons or operating keys (hardware keys). The touch panel is a general-purpose touch panel, and an arbitrary system, such as a capacitance system, an electromagnetic induction system, a resistance film system, and an infrared system can be used. Moreover, the touch panel may be provided on a display surface of the display 36, or may be provided separately from the display 36. However, a touch display that a touch panel is integrally formed with the display 36 may be provided. When a touch panel is provided on the display surface of the display 36, a GUI (Graphical User Interface) including software keys (operating keys) such as icons is displayed on the display 36. In such a case, an input operation may be received via the GUI (operation screen). The same is applied also to an input device 70 described later.

In addition, the software key means a key or icon reproduced by software on the display surface of the display, for example. On the contrary, the hardware key means a key or push button provided as a physical device.

The input control circuit 28 outputs an operation signal or operation data according to an operation of the input device 34 to the CPU 22. For example, the input control circuit 28 applies a voltage or the like required for the touch panel included in the input device 34, and when a touch operation (touch input) is performed within a touch effective range of the touch panel, the input control circuit 28 outputs to the CPU 22 touch coordinate data indicative of a position of the touch input. Moreover, the input control circuit 28 outputs to the CPU 22 an operation signal or operation data according to an operation of the operating button or hardware key included in the input device 34. The same is applied also to an input control circuit 64 described later.

The display control circuit 30 includes a GPU, VRAM, etc., and the GPU generates, under instructions of the CPU 22, screen data for displaying various kinds of screens in the VRAM with using image generation data 304a (see FIG. 9) stored in the RAM 24, and outputs the generated screen data to the display 36. For example, various operating screens etc. are displayed on the display 36. The same is applied also to a display control circuit 66 described later.

The communication circuit 32 is a communication circuit for connecting with the network such as a LAN and an internet. This communication circuit 32 is a wired communication circuit or a wireless communication circuit, and communicates via the network, according to instructions from the CPU 22, with an external computer of a further information processing apparatus 14 or a further image forming apparatuses 12, utilizing protocols such as TCP/IP. However, the communication circuit 32 can perform communication directly with the further information processing apparatus 14 or the further image forming apparatus 12 by a short-distance wireless communication etc. without using the network 16.

In addition, the electric structure of the information processing apparatus 14 shown in FIG. 2 is a mere example, and should not need to be limited to this.

Returning to FIG. 1, the image forming apparatus 12 is an MFP (Multifunction Peripheral) that comprises a copy function, a print function, a scanner function, a facsimile function, etc. However, the image forming apparatus 12 should just be provided with the print function at least, for example, and thus may be a print device (printer).

Figure 3:
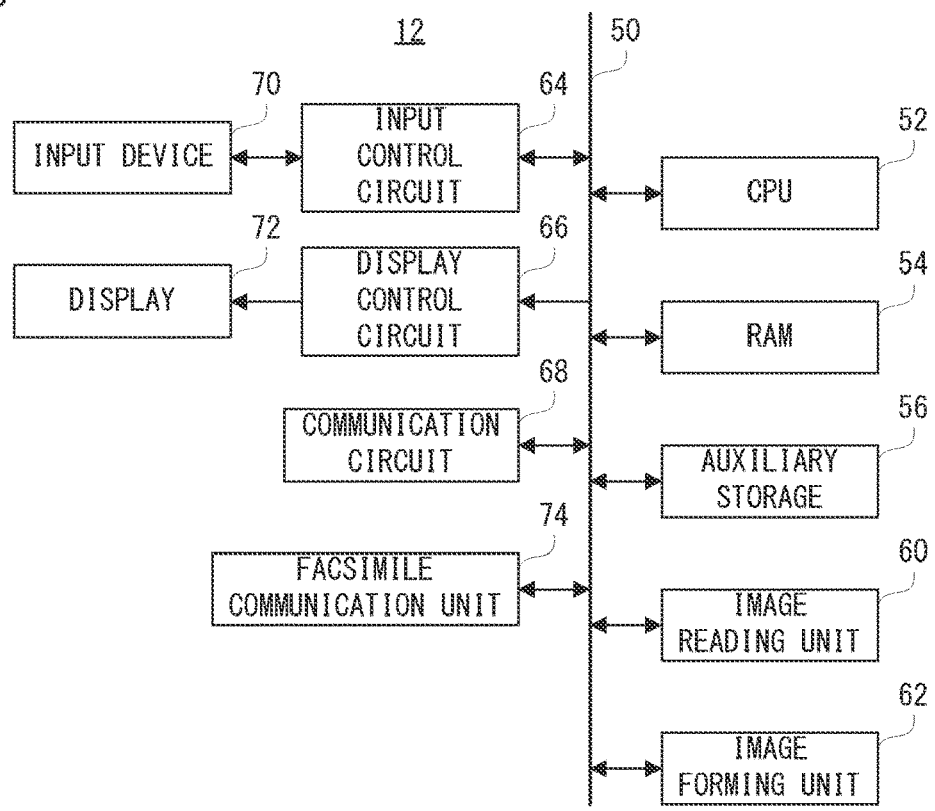
FIG. 3 is a block diagram showing electric structure of an image forming apparatus shown in FIG. 1.

FIG. 3 is a block diagram showing electric structure of the image forming apparatus 12 shown in FIG. 1. With reference to FIG. 3, the image forming apparatus 12 includes a CPU 52. The CPU 52 is connected, via a bus 50, with a RAM 54, an auxiliary storage 56, an image reading unit 60, an image forming unit 62, an input control circuit 64, a display control circuit 66, a communication circuit 68 and a facsimile communication unit 74. Moreover, an input device 70 is connected to the input control circuit 64, and a display 72 is connected to the display control circuit 66.

The CPU 52 is in charge of overall control of the image forming apparatus 12. The RAM 54 is used as a working area and a buffer area for the CPU 52. The auxiliary storage 56 is an HDD (hard disc drive), for example, and stores a control program for controlling, by the CPU 52, operations of respective components of the image forming apparatus 12, various kinds of data, etc. However, as the auxiliary storage 56, another nonvolatile memory such as an SSD, a flash memory and an EEPROM may be used instead of the HDD or together with the HDD.

The image reading unit 60 is provided with a light source, a plurality of mirrors, an imaging lens, a line sensor, etc. This image reading unit 60 exposes an original surface by the light source, and leads a reflected light reflected from the original surface to the imaging lens by the plurality of mirrors. Then, the reflected light is imaged on light receiving elements of the line sensor by the imaging lens. The line sensor detects luminance and chromaticity of the reflected light that is imaged onto the light receiving elements, whereby read image data based on an image of the original surface is generated.

The image forming unit (printing device) 62 is a general-purpose laser printer, and is provided with a photo-conductor, an electrostatic charger, an exposing device, a developing device, a fixing device, etc., and prints an image (print image) corresponding to print image data on a recording paper (sheet) or the like. However, the image forming unit 62 may be formed by an ink jet printer instead of the laser printer.

In addition, although detailed description is omitted, the image forming unit 62 is provided with a color print function, and includes image forming stations each including the photo-conductor, the electrostatic charger, the developing device, etc. for each color of Y (yellow), M (magenta), C (cyan) and K (black) are formed.

The facsimile communication unit 74 includes a facsimile modem, a network control unit (NCU) and a coding/decoding unit. Based on the facsimile communication standard, the facsimile modem modulates coded image data into an analog signal of a format suitable for transmission on the facsimile communication network, and acquires the coded image data by decoding the analog signal form other apparatus. The network control unit is connected to a facsimile telecommunication network via a telephone line, a circuit switch, etc. The network control unit is provided in order to connect the facsimile modem to the facsimile telecommunication network, and performs a circuit control to close and open the facsimile telecommunication network. Furthermore, according to a predetermined facsimile communication protocol, the network control unit transmits and receives image data, control signals, etc., and performs automatic call processing and automatic incoming call processing of the facsimile communication. The coding/decoding unit encodes the image data into a predetermined format. The coded data is temporarily stored by the auxiliary storage 56, and is transmitted to other apparatus by the facsimile communication under instructions of the CPU 52. Moreover, the coding/decoding unit performs processing that restores the data transmitted from other apparatus through the facsimile communication into the original format by decoding the data.

In addition, the electric structure of the image forming apparatus 12 shown in FIG. 3 is a mere example, and should not need to be limited to this.

In such the image forming system 10, the print data including data for printing (print target data) and data of job conditions is generated in the information processing apparatus 14, and the print data is transmitted to the image forming apparatus 12, and print processing (print job) is executed in the image forming apparatus 12 according to the print data.

The print target data includes image data, document data, etc. stored in the information processing apparatus 14, for example.

The job conditions include conditions related to a normal print function (normal print conditions), such as the number of copies to print, original paper size, output paper size, original orientation, color mode, single-sided/double-sided print, magnification, presence/absence of staple processing, presence/absence of page aggregation, etc. When the print job is to be executed, a GUI (graphical user interface) screen of the printer driver for setting the normal print conditions is displayed on the display 36 of the information processing apparatus 14. In addition, since the technology of setting the normal print conditions via the GUI screen is a well-known technology, and has nothing to do with an essential portion of the present invention directly, a detailed description thereof is omitted here.

When the image forming apparatus 12 acquires the print data, data (print image data) of an image for print (print image) is generated, which is obtained through image processing applied to the print target data included in the print data. The print image data is image data that is generated according to the print conditions such as the color mode, the magnification, the page aggregation, etc. and the print conditions are reflected to the print target data. Moreover, the print image data is included in the print data.

Moreover, in the image forming system 10 of this first embodiment, a registration print function and a print data transmission function can be set as a function of the print job (print function).

The registration print function means a function that the print data from the information processing apparatus 14 is temporarily stored in the image forming apparatus 12 that serves as a parent apparatus, and thereafter, the print data stored in the parent apparatus is received by any one of a plurality of child apparatuses according to an operation of an operation panel (input device 70) thereof so as to be printed. That is, the registration print function is a function for utilizing one of the plurality of image forming apparatuses 12 as a print server.

Figure 4:
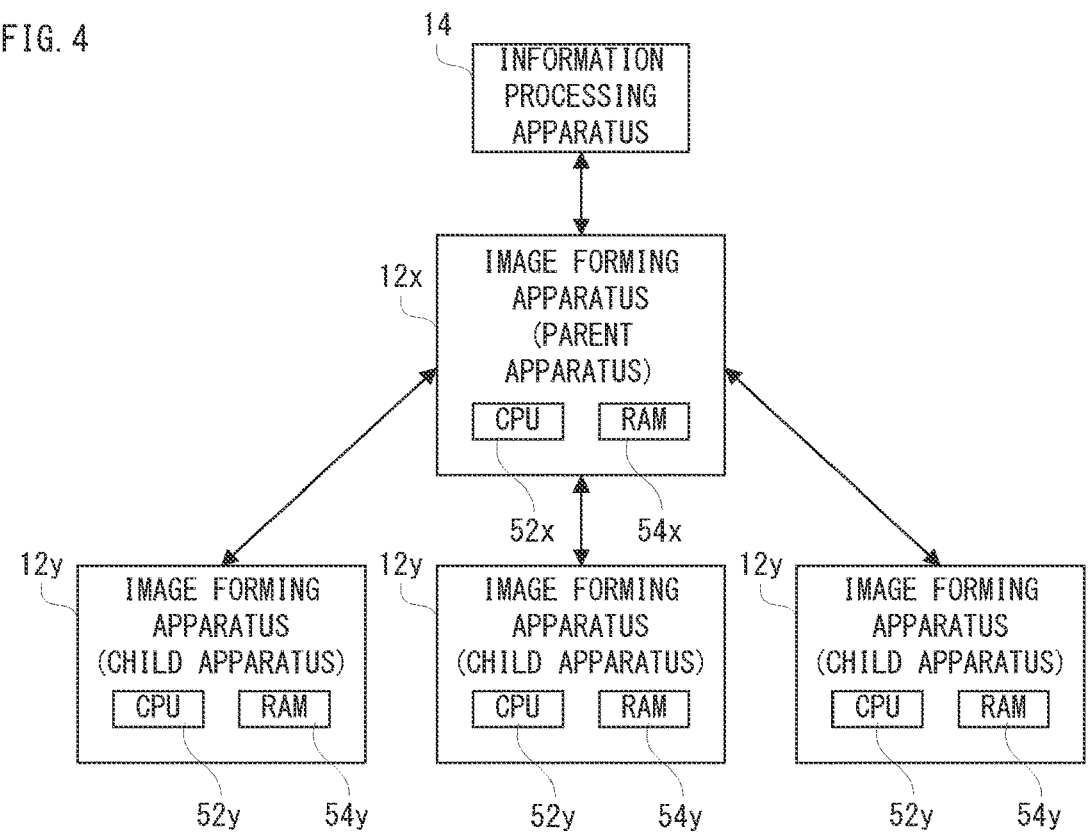
FIG. 4 is an illustration view showing relationship of respective apparatuses included in the image forming system.

Therefore, in the image forming system 10 of this first embodiment, as shown in FIG. 4, any one image forming apparatus 12 out of the plurality of image forming apparatuses 12 is set in advance as the parent apparatus 12x that is an example of the first image forming apparatus, and the image forming apparatuses 12 other than parent apparatus 12x are set as child apparatuses 12y each of which is an example of a second image forming apparatus. In addition, subscripts "x" and "y" applied to the reference numerals are subscripts for distinguishing between the parent apparatus and the child apparatus, and for example, in a case of a CPU included in the parent apparatus 12x, it is indicated as a CPU 52x, and so on. However, in the following, when it is not necessary to distinguish the parent apparatus 12x and the child apparatus 12y, the subscript is arbitrarily omitted so as to refer to inclusively.

If the registration print function is set in the image forming system 10, print data including a command for instructing the parent apparatus 12x to save the print data (save instruction) is transmitted to the parent apparatus 12x. In the parent apparatus 12x that receives the print data including the save instruction, this print data is saved in the auxiliary storage 56x. Then, when a print instruction is received in a certain child apparatus 12y from a user, the print data is transferred to that child apparatus 12y from the parent apparatus 12x, and the print job related to the print data is executed by the child apparatus 12y. That is, in the registration print function, the parent apparatus 12x is used as a print server.

Moreover, the print data transmission function means a function that when the print job is executed in a certain image forming apparatus 12, the print image data included in the print data concerning the print job may be transmitted to a predetermined destination apparatus. The print image data is transmitted by facsimile communication, or transmitted by electronic mail (E-mail) with being attached thereto. A transmission destination apparatus corresponds to the image forming apparatus 12 other than the image forming apparatus having executed the print job (i.e., a further image forming apparatus 12), the information processing apparatuses 14 and an external apparatus capable of communicating via the network 16 or the like.

Figure 5:
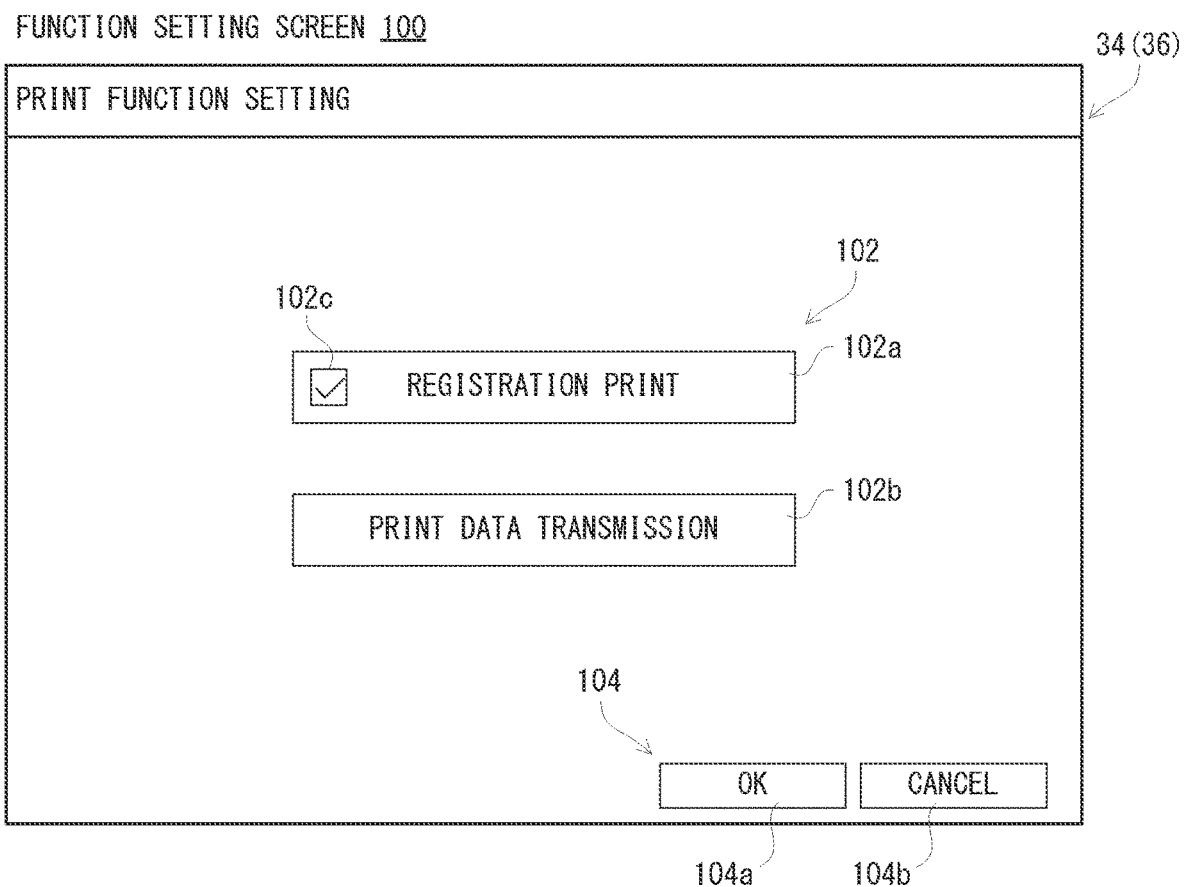
FIG. 5 is an illustration view showing an example of a function setting screen.

As shown in FIG. 5, The GUI of the printer driver of this embodiment includes a function setting screen 100 in addition to the various kinds of setting screens for setting the normal print conditions.

The function setting screen 100 is a screen for setting conditions related to the registration print function and the print data transmission function (conditions other than the normal print conditions) out of the job conditions, and includes a setting portion 102 and an indication portion 104.

The setting portion 102 includes a setting icon 102a for the registration print function and a setting icon 102b for the print data transmission function.

The setting icon 102a of the registration print function is an icon for setting enabling/disabling of the registration print function, and the setting icon 102b is an icon for displaying a transmission destination setting screen 120 (see FIG. 6) capable of setting the content of the print data transmission function.

A check box 102c is provided in the setting icon 102a of the registration print function. If operating the setting icon 102a (including the check box 102c) for the registration print function in a state where the check mark is not displayed in the check box 102c, a check mark becomes to be displayed in the check box 102c. On the other hand, if operating the setting icon 102a for the registration print function in a state where the check mark is being displayed in the check box 102c, the check mark becomes not to be displayed.

When the check mark is displayed in the check box 102c, the registration print function is enabled, and when the check mark is not displayed in the check box 102c, the registration print function is disabled. Therefore, the user can switch enabling/disabling of the registration print function by operating the setting icon 102a for the registration print function.

An indication portion 104 is arranged at the lower right of the function setting screen 100, and an OK icon 104a and a cancel icon 104b are included in the indication portion 104. The OK icon 104a is an icon to which a function to settle the content that is set on that screen (here, function setting screen 100) is assigned. The cancel icon 104b is an icon to which a function to cancel the content that is set on that screen (here, function setting screen 100) is assigned. In addition, when the cancel icon 104b is selected, the operation screen (here, function setting screen 100) having been displayed till that time is closed, and another operation screen (for example, a setting screen for setting the normal print conditions) or an initial screen (home screen) are displayed. The same is applied also to an OK icon 128a and a cancel icon 128b, an OK icon 144a and a cancel icon 144b, and an OK icon 164a and a cancel icon 164b all described later.

Figure 6:
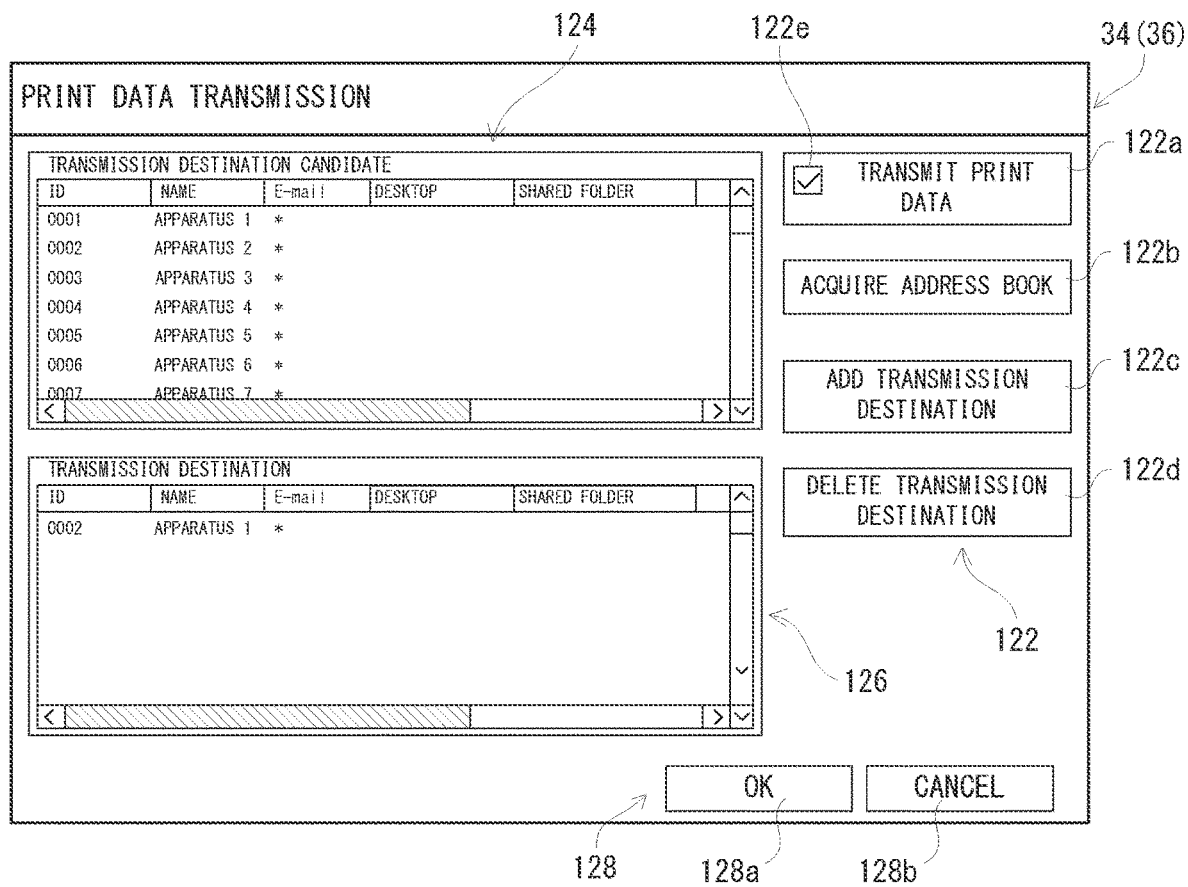
FIG. 6 is an illustration view showing an example of a transmission destination setting screen.

If the icon 102b for setting the print data transmission function is operated in the function setting screen 100, a transmission destination setting screen 120 as shown in FIG. 6 is displayed on the display 36.

The transmission destination setting screen 120 is a screen for setting enabling/disabling of the print data transmission function, and for setting a transmission destination apparatus when the print data transmission function is enabled.

The transmission destination setting screen 120 includes a setting portion 122, a candidate display portion 124, a transmission destination display portion 126 and an indication portion 128. In addition, the indication portion 128 includes the OK icon 128a and the cancel icon 128b.

The setting portion 122 includes a first icon 122a, a second icon 122b, a third icon 122c and a fourth icon 122d.

The first icon 122a is an icon to which a function to set enabling/disabling of the print data transmission function is assigned. A check box 122e is provided in the first icon 122a. If the first icon 122a (including the check box 122e) is operated, a check mark is displayed in the check box 122e, or a check mark is not displayed. When the check mark is displayed in the check box 122e, the print data transmission function is enabled, and when the check mark is not displayed in the check box 122e, the print data transmission function is disabled. That is, the user can switch enabling/disabling of the print data transmission function by operating the first icon 122a.

The second icon 122b is an icon to which a function of acquiring destination information (mail address, facsimile number, etc.) of an apparatus that serves as a candidate (candidate apparatus) of the transmission destination apparatus is assigned. In this embodiment, the data of the destination information of the candidate apparatus (data of an address book including the destination information) is stored in the parent apparatus 12x, and if the second icon 122b is operated, the data of the destination information of the candidate apparatus (destination information data) is transferred to the information processing apparatus 14 from the parent apparatus 12x. If the information processing apparatus 14 acquires the destination information data of the candidate apparatus, information of the candidate apparatus (including a device ID, name of the candidate apparatus, etc.) is listed and displayed in a candidate display portion 124 as shown in FIG. 6. On the other hand, in a state where the information processing apparatus 14 does not acquire the destination information data of the candidate apparatus, the information of the candidate apparatus is not displayed in the candidate display portion 124.

In addition, the destination information data of the candidate apparatus may be stored in the information processing apparatus 14. In this case, the information of the candidate apparatus may be displayed from the beginning, and the second icon 122b may be omitted.

The third icon 122c is an icon to which a function to select a transmission destination apparatus out of the candidate apparatuses (adds a transmission destination apparatus) is assigned. Specifically, when the third icon 122c is operated in a state where at least one apparatus out of the candidate apparatuses displayed in the candidate display portion 124, the apparatus being currently selected is set as the transmission destination apparatus. Information on the apparatus that is set as the transmission destination apparatus is listed and displayed in the transmission destination display 126.

In addition, a pattern or suitable color is applied to a portion corresponding to the information on the apparatus (apparatus under selection) selected among the candidate apparatuses displayed on the candidate display portion 124. Accordingly, the user can recognize the apparatus being selected by that user.

The fourth icon 122d is an icon to which a function to delete the transmission destination apparatus is assigned. Specifically, when the fourth icon 122d is operated in a state where at least one apparatus out of the transmission destination apparatuses displayed in the transmission destination display portion 126, the apparatus being currently selected is removed from the transmission destination apparatus (the setting of the transmission destination apparatus is released). Information on the apparatus removed from the transmission destination apparatus is deleted from the transmission destination display portion 126.

In addition, when the print data transmission function is disabled, the second icon 122b, the third icon 122c and the fourth icon 122d may be disabled so as not to be selected.

If the OK icon 128a is operated in a state where the print data transmission function is enabled and one or more transmission destination apparatuses are set, the information processing apparatus 14 generates data (transmission instruction data) of a command (transmission instruction) to transmit the print image data to the transmission destination apparatus utilizing the print data transmission function. This transmission instruction data is included in the print data.

Figures 7, 8:
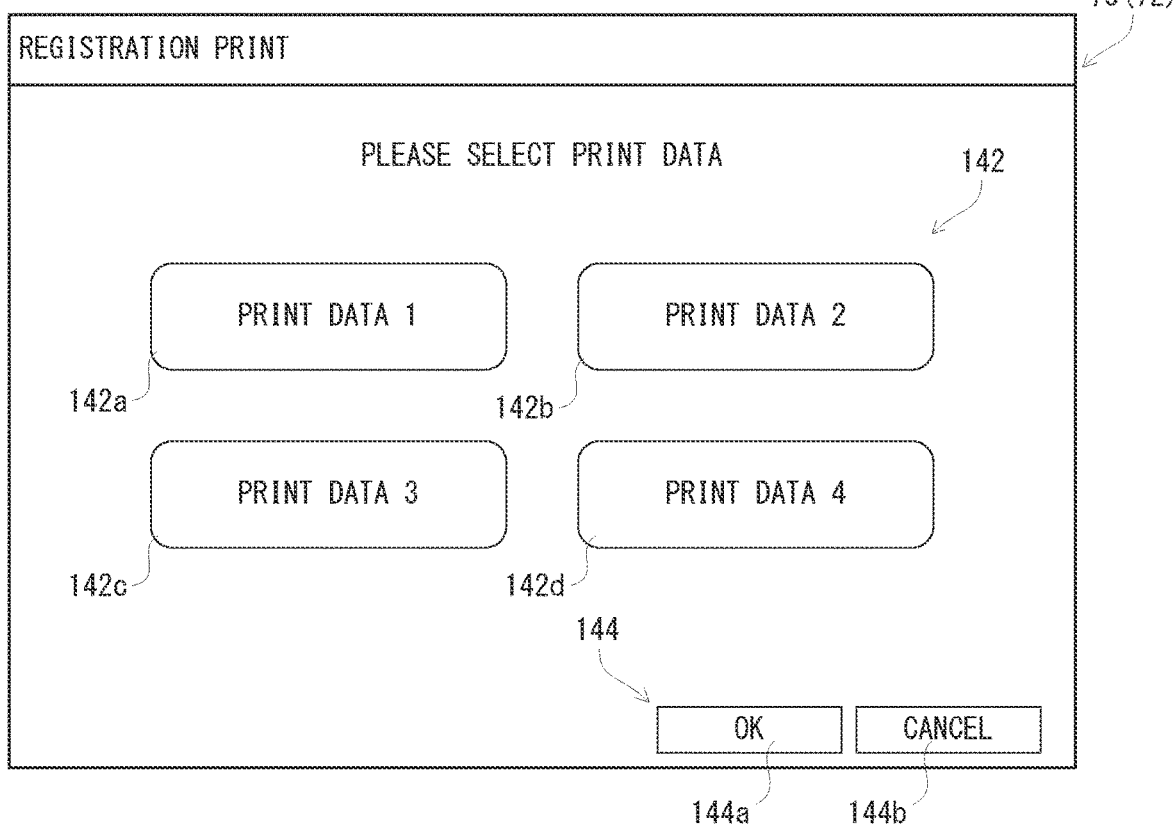
FIG. 7 is an illustration view showing an example of a print data selection screen.
FIG. 8 is an illustration view showing an example of a destination information table.

Then, as described above, the print data for the print job utilizing the registration print function is transmitted to the parent apparatus 12x from the information processing apparatus 14 to be held in the parent apparatus 12x. Thereafter, if the user performs an operation for utilizing the registration print function while going a placing location of an arbitrary child apparatus 12y (child apparatus 12y for outputting), a print data selection screen 140 as shown in FIG. 7 is displayed on the display 72y of the child apparatus 12y for outputting.

The print data selection screen 140 is a screen for selecting the print data for outputting out of the print data concerning the print job utilizing the registration print function, and includes a plurality of selecting icons 142 and indication portion 144. Moreover, in the print data selection screen 140, a message (notification text) for prompting selection of the print data is displayed, for example, "Please select print data". In addition, the indication portion 144 includes the OK icon 144a and the cancel icon 144b.

Each of the plurality of selection icons 142 corresponds to each of a plurality of printing data currently held in the parent apparatus 12x. A character string for identifying corresponding print data (for example, a data name of the print data, a creator, a created date and time, date and time registered in the parent apparatus 12x, etc.) is displayed in each of the plurality of selection icons 142. In an example shown in FIG. 7, four print data are held in the parent apparatus 12x, and four selection icons 142a-142d respectively corresponding to the four print data are displayed in the print data selection screen 140.

The user can select the print data that he/she want to output by operating the selection icon 142.

Then, the selection icon 142 operated by the user becomes in a selected state. If the OK button 146a is operated in a state where any one of the plurality of selection icons 142 is selected, the print data corresponding to the selection icon 142 in a selected state is settled as the print data for outputting (dealt with as the print data for outputting). Hereinafter, a series of user operations until the print data for outputting is settled may be called a print instruction operation.

If the print data for outputting is settled, the child apparatus 12y for outputting transmits a print command (print instruction) of the print job concerning the print data for outputting to the parent apparatus 12x. The parent apparatus 12x transmits the print data for outputting concerning the print instruction to the child apparatus 12y for outputting when receiving the print instruction.

When transmission instruction data is not included in the print data for outputting, the parent apparatus 12x transmits the print data for outputting to the child apparatus 12y for outputting as it is.

On the other hand, when transmission instruction data is included in the print data for outputting, the parent apparatus 12x deletes the transmission instruction data from the print data for outputting, and transmits the print data not including the transmission instruction data to the child apparatus 12y for outputting and transmits the print image data included in the print data for outputting to the transmission destination apparatus.

The child apparatus 12y for outputting executes the print job according to the print data for outputting when acquiring (receiving) the print data for outputting.

The data of the candidate apparatus and the transmission destination information are managed on a destination information table (address book) as shown in FIG. 8, for example. The destination information table is created in advance and stored in a predetermined storing location such as the auxiliary storage 56x of the parent apparatus 12x, the auxiliary storage 26 of the information processing apparatus 14 or an external server that the information processing apparatus 14 can access, etc. The destination information table is stored in the auxiliary storage 56 of the parent apparatus 12x in this embodiment.

As shown in FIG. 8, in the destination information table, the contents (for example, e-mail address, facsimile number) of a destination to which the print image data can be transmitted are described corresponding to inherent identification information (device ID) assigned to each of the apparatuses that may serve candidates for the transmission destination apparatus.

In addition, although a character string, a symbol, a pattern or the like corresponding to the identification information and the destination is described in each column of the destination information table shown in FIG. 8, these contents are only created and used by internal processing in the information processing apparatus 14 and the parent apparatus 12x. Therefore, the contents described in each column of the destination information table may be described by symbols or the like that cannot be deciphered by humans.

In addition, in the image formation system 10 of this embodiment, when the setting processing of the transmission destination apparatus is executed in the information processing apparatus 14, and when the print image data is transmitted to the transmission destination apparatus from the parent apparatus 12x, the destination information table is used.

An operation of the image forming system 10 as described above is implemented by executing, by the CPU 22 of the information processing apparatus 14 that serves as a first external apparatus, a control program for the information processing apparatus stored in the RAM 24, and by executing, by the CPU 52 of the image forming apparatus 12, a control program for the image forming apparatus stored in the RAM 54. In addition, the control program for image forming apparatus may be set in both the parent apparatus 12x that is a first image forming apparatus and the child apparatus 12y that is second image forming apparatus. Then, when being set to the parent apparatus 12x, the control program for the parents apparatus 12x is executed, and when being set to the child apparatus 12y, the control program for the child apparatus 12y is executed. Specific processing will be described later using flowcharts.

Figure 9:
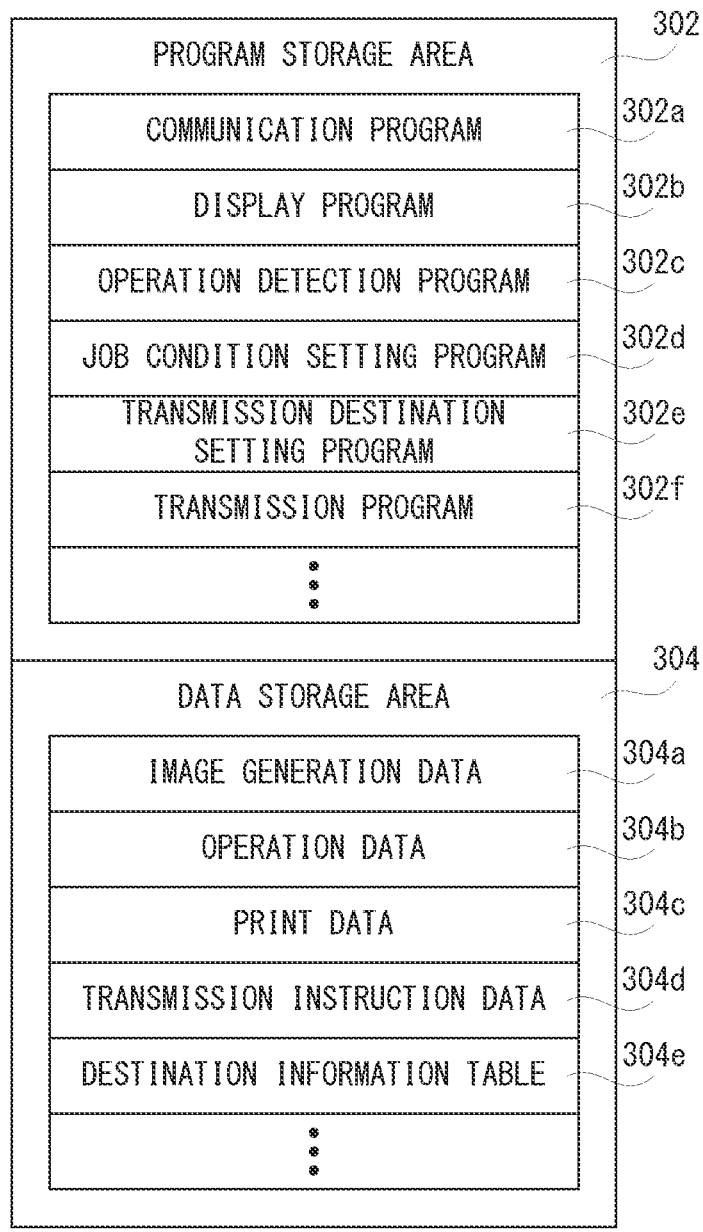
FIG. 9 is an illustration view showing an example of a memory map of a RAM of the information processing apparatus shown in FIG. 2.

FIG. 9 is an illustration view showing an example of a memory map 300 of the RAM 24 shown in FIG. 2. As shown in FIG. 9, the RAM 24 includes a program storage area 302 and a data storage area 304. The program storage 302 of the RAM 24 stores the control program for information processing apparatus as described above. The control program for information processing apparatus includes a communication program 302a, a display program 302b, an operation detection program 302c, a job condition setting program 302d, a transmission destination setting program 302e and a transmission program 302f.

The communication program 302a is a program for performing communication with the image forming apparatus 12 including the parent apparatus 12x or an external computer indirectly via the network 16 or directly without using the network 16.

The display program 302b is a program for generating display image data corresponding to various kinds of screens such as the function setting screen 100, the transmission destination setting screen 120, etc., using image generation data 304a described later to output to the display 36.

The operation detection program 302c is a program for acquiring an operation signal (operation data) that is output from the input control circuit 38 according to an operation of the input device 34. Moreover, when a touch panel is provided as the input device 34, the operation detection program 302c is also a program for acquiring the touch coordinate data that is output from the input control circuit 28. The CPU 22 determines whether various kinds of buttons, icons, etc. in various kinds of screens displayed on the display 36 are operated according to the operation data or the touch coordinate data acquired by the operation detection program 302c.

The job condition setting program 302d is a program for setting, according to the input operation by the user, the normal print conditions, conditions concerning the registration print function and conditions concerning the print data transmission function. In addition, when setting the conditions concerning the registration print function and the conditions concerning the print data transmission function, the function setting screen 100, the transmission destination setting screen 120, etc. are displayed on the display 36 according to the display program 302b.

The transmission destination setting program 302e is a program for setting a transmission destination apparatus according to a user operation when the print data transmission function is enabled.

The transmission program 302f is a program for transmitting the print data to the image forming apparatus 12 that is designated. Moreover, the transmission program 302f is also a program for transmitting the print data concerning the print job utilizing the registration print function to the parent apparatus 12x. However, the communication program 302a is executed at the time of the transmission of the print data.

In addition, although illustration is omitted, the program storage area 302 further stores an acquisition program for acquiring the destination information of the candidate apparatus from the storage destination apparatus (for example, the parent apparatus 12x) when the destination information data of the candidate apparatus is not stored in the information processing apparatus 14, a program for selecting and executing various kinds of functions that the information processing apparatus 14 is provided with.

Moreover, the data storage area 304 of the RAM 24 stores the image generation data 304a, the operation data 304b, the print data 304c, the transmission instruction data 304d, the destination information data 304e, etc.

The image generation data 304a is data of polygon data or texture data for generating display image data corresponding to various kinds of screens to be displayed on the display 36. The operation data 304b is operation data detected according to the operation detection program 302c, and is stored according to a time series. The print data 304c is data of the print job that includes at least the print target data, the data of the normal print conditions, the data indicating enabling/disabling of the registration print function, etc. Moreover, the print data 304c includes the transmission instruction data 304d when utilizing the print data transmission function. The transmission instruction data 304d includes the data indicating that the print data transmission function is enabled and data of the identification information for identifying the transmission destination apparatus or data of the destination information of the transmission destination apparatus. The destination information data 304e is data of the destination information of the candidate apparatus.

In addition, although illustration is omitted, the data storage area 304 stores other data required for execution of the control program for information processing apparatus, or is provided with a timer(s) (counter(s)) and a register(s) required for execution of the control program for the information processing apparatus.

Figure 10:
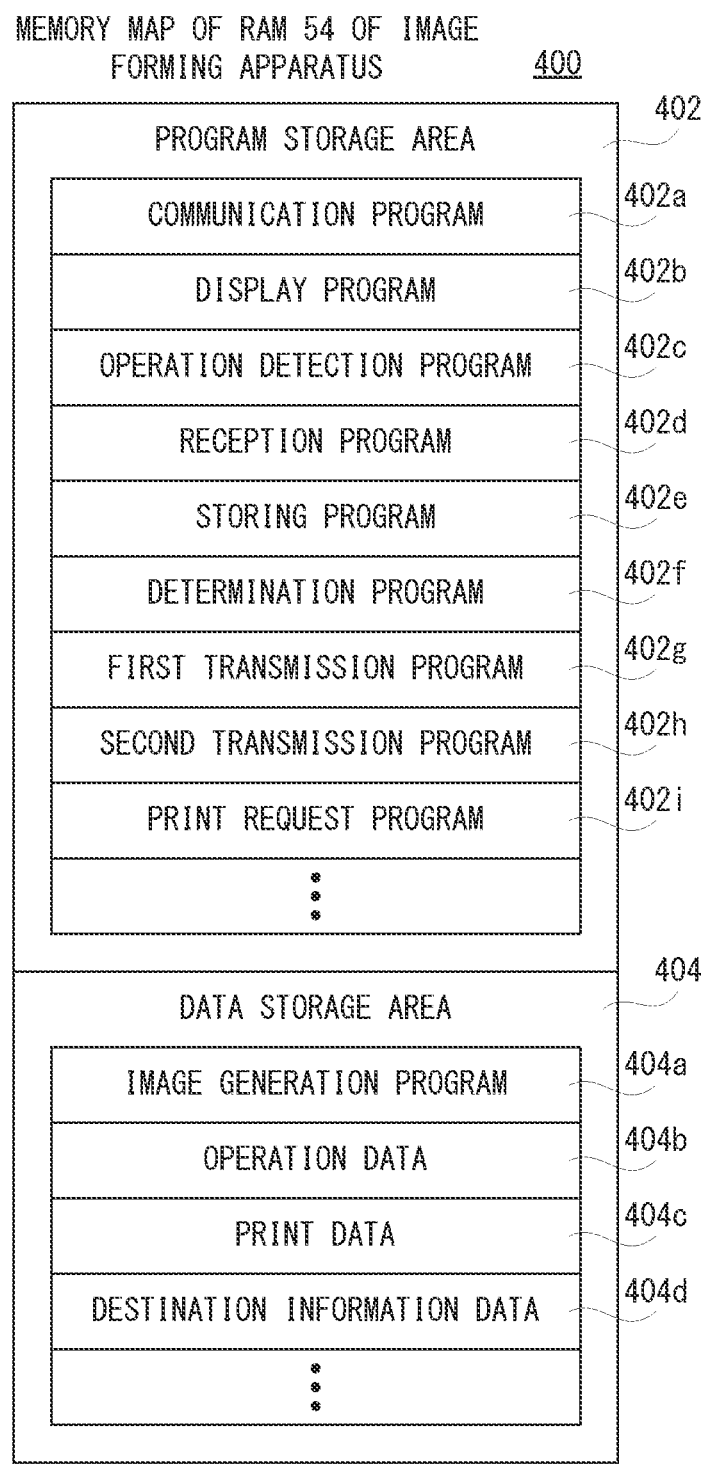
FIG. 10 is an illustration view showing an example of a memory map of a RAM of the image forming apparatus shown in FIG. 3.

FIG. 10 is an illustration view showing an example of a memory map 400 of the RAM 54 of the image forming apparatus 12 shown in FIG. 3. As shown in FIG. 10, the RAM 54 includes a program storage area 402 and a data storage area 404. As described above, the program storage area 402 of the RAM 54 stores a control program for the image forming apparatus. The control program for the image forming apparatus includes a communication program 402a, a display program 402b, an operation detection program 402c, a reception program 402d, a storing program 402e, a determination program 402f, a first transmission program 402g, a second transmission program 402h and a print instruction program 402i.

The communication program 402a is a program for performing communication with the information processing apparatus 14, other image forming apparatus 12 or an external computer indirectly via the network 16 or directly without using the network 16. Moreover, the communication program 402a is a program for performing facsimile communication with other apparatus via a facsimile communication network.

The display program 402b is a program for generating display image data corresponding to various kinds of screens such as the print data selection screen 140, etc., using image generation data 404a described later to output to the display 72.

The operation detection program 402c is a program for acquiring an operation signal (operation data) that is output from the input control circuit 64 according to an operation of the input device 70. Moreover, when a touch panel is provided as the input device 70, the operation detection program 302c is also a program for acquiring the touch coordinate data that is output from the input control circuit 64. The CPU 52 determines whether various kinds of buttons, icons, etc. in various kinds of screens displayed on the display 72 are operated according to the operation data or the touch coordinate data acquired by the operation detection program 402c.

The reception program 402d is a program for receiving the print data transmitted from the information processing apparatus 14. Moreover, the reception program 402d is also a program for receiving the print data transmitted from the parent apparatus 12x. However, the communication program 402a is executed at the time of reception of the print data.

The storing program 402e is a program for storing, when the received print data is print data concerning the print job utilizing the registration print function, the print data in the auxiliary storage 56.

The determination program 402f is a program for determining whether the transmission instruction data is included in the print data for outputting.

The first transmission program 402g is a program for transmitting, when receiving the print instruction of the print job utilizing the registration print function, the print data for outputting concerning the print instruction to the child apparatus 12y for outputting. However, the communication program 402a is executed at the time of transmission of the print data.

The second transmission program 402h is a program for transmitting, when the transmission instruction data is included in the print data for outputtting, the print image data included in this print data for outputting to a transmission destination apparatus. However, the communication program 402a is executed at the time of transmission of the print image data.

The print instruction program 402i is a program for transmitting a print instruction of the print job concerning the print data for outputting selected by the user to the parent apparatus 12x. However, the communication program 402a is executed at the time of transmission of the print instruction.

In addition, although illustration is omitted, the program storage area 402 further stores an image reading program for reading (scanning) an image of an original by controlling the image reading unit 60 and outputting an image signal (read image data) corresponding to the read image, an image forming program for forming a multicolor or monochromatic image onto a recording medium (sheet) according to the print image data by controlling the image forming unit 62, a program for selecting and executing various kinds of functions provided by the image forming apparatus 12, etc. Moreover, the program storage area 402 also stores an acquisition program for acquiring, when the destination information data of the transmission destination apparatus is not stored in the own apparatus, the destination information data of the transmission destination apparatus from a storing destination apparatus (for example, information processing apparatus 14), etc.

Moreover, the print instruction program 402i may be omitted in the control program for image forming apparatus of the parent apparatus 12x. Furthermore, in the control program for image forming apparatus of the child apparatus 12y, the determination program 402f, the first transmission program 402g and the second transmission program 402h may be omitted.

Moreover, the data storage area 404 of the RAM 54 stores the image generation data 404a, the operation data 404b, the print data 404c, the destination information data 404d, etc.

The image generation data 404a is data of polygon data or texture data for generating display image data corresponding to various kinds of screens displayed on the display 72. The operation data 404b is operation data detected according to the operation detection program 402c, and is stored according to a time series. The print data 404c is data of the print job that includes at least the print image data, the data of the normal print conditions, the data indicating enabling/disabling of the registration print function, etc. Moreover, the print data 304c may include the transmission instruction data. The destination information data 404d is data of the destination information of the candidate apparatus and the transmission destination apparatus.

In addition, although illustration is omitted, the data storage area 404 stores other data required for execution of the control program for image forming apparatus, and is provided with a timer(s) (counter(s)) and a register(s) required for execution of the control program for the image forming apparatus.

Figure 11:
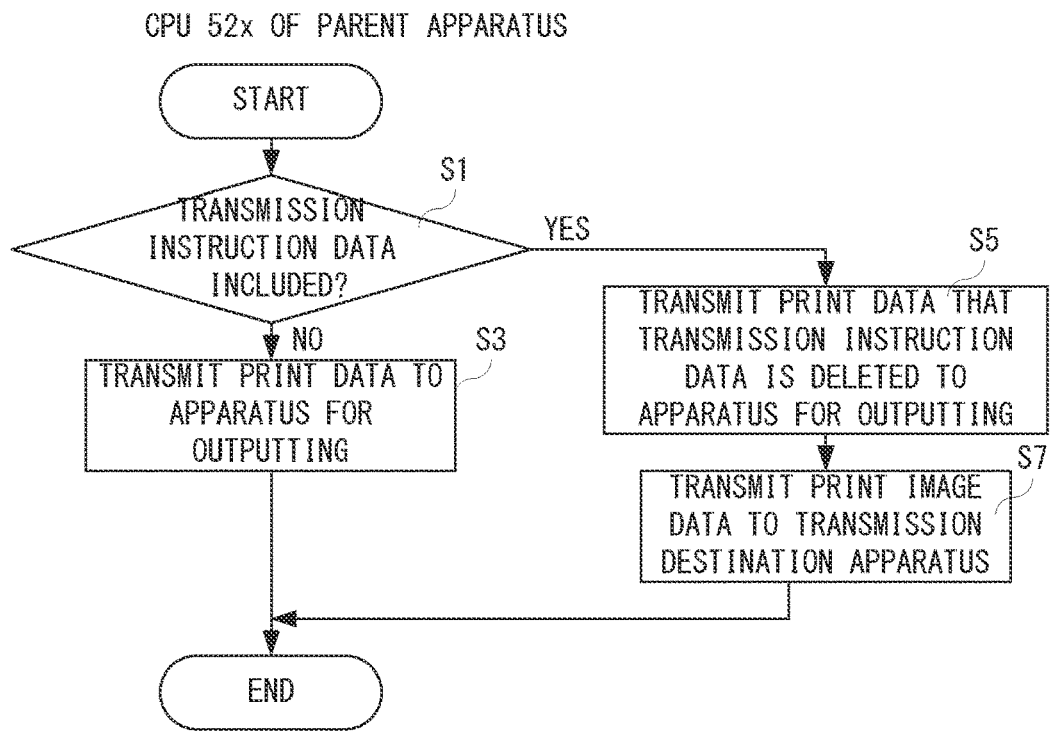
FIG. 11 is a flowchart showing an example of transmission processing of a CPU of the image forming apparatus (parent apparatus).

FIG. 11 is a flowchart showing an example of transmission processing of the CPU 52x of the parent apparatus 12x. This transmission processing is started when receiving a print instruction.

As shown in FIG. 11, if the transmission processing is started, the CPU 52x determines, in a step S1, whether the transmission instruction data is included in the print data for outputting concerning the print instruction. If "NO" is determined in the step S1, that is, if it is determined that the transmission instruction data is not included in the print data for outputting, the print data for outputting is transmitted to the child apparatus 12y for outputting in the step S3, and then, the transmission processing is ended.

On the other hand, if "YES" is determined in the step S1, that is, it is determined that the transmission instruction data is included in the print data for outputting, in a step S5, the print data for outputting from which the transmission instruction data is deleted is transmitted to the child apparatus 12y for outputting, and in a step S7, the print image data included in the print data for outputting is transmitted to a transmission destination apparatus, and then, the transmission processing is ended.

Figure 12:
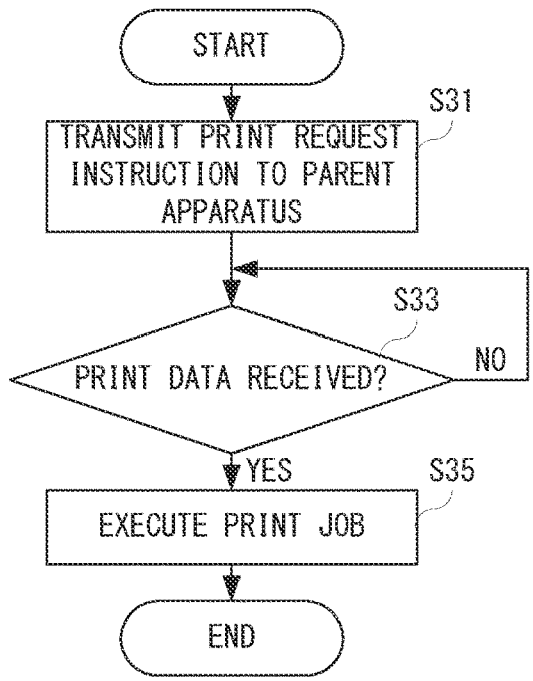
FIG. 12 is a flowchart showing an example of print processing of a CPU of the image forming apparatus (child apparatus).

FIG. 12 is a flowchart showing an example of the print processing of the CPU 52y of the child apparatus 12y. This print processing is started when a print instruction operation is received by the child apparatus 12y.

As shown in FIG. 12, if the print processing is started, the CPU 52y transmits the print instruction to the parent apparatus 12x in a step S31, and determines, in a step S33, whether the print data is received. If "NO" is determined in the step S33, that is, if it is determined that the print data is not received, the process returns to the step S33.

On the other hand, if "YES" is determined in the step S33, that is, if it is determined that the print data is received, the print job is executed according to the print data in a step S35, and then, the print processing is ended.

In this first embodiment, when receiving the print instruction of the print data, the parent apparatus 12x transmits the print data to the child apparatus 12y for outputting, and transmits the print image data included in the print data to the transmission destination apparatus when the transmission instruction data is included in the print data. Therefore, the user can perform the print processing by a desired image forming apparatus (child apparatus 12y), and can transmit the print image to a desired transmission destination apparatus simultaneously with the print processing. Therefore, it is possible to improve convenience for the user.

Second Embodiment

An image forming system 10 according to the second embodiment is the same or similar to the image forming system 10 according to the first embodiment except that a transmission result of the print image data is notified to the user on the child apparatus 12y for outputting when the print image data included in the print data for outputting is transmitted to the transmission destination apparatus, and therefore, only the contents different from those of the first embodiment will be described while omitting duplicate description.

In the second embodiment, when the transmission instruction data is included in the print data for outputting, the parent apparatus 12x transmits the print data for outputting from which the transmission instruction data is deleted to the child apparatus 12y for outputting, and the print image data included in the print data for outputting to the transmission destination apparatus, and data of the transmission result of the print image data (transmission result data) to the child apparatus 12y for outputting.

Figure 13:
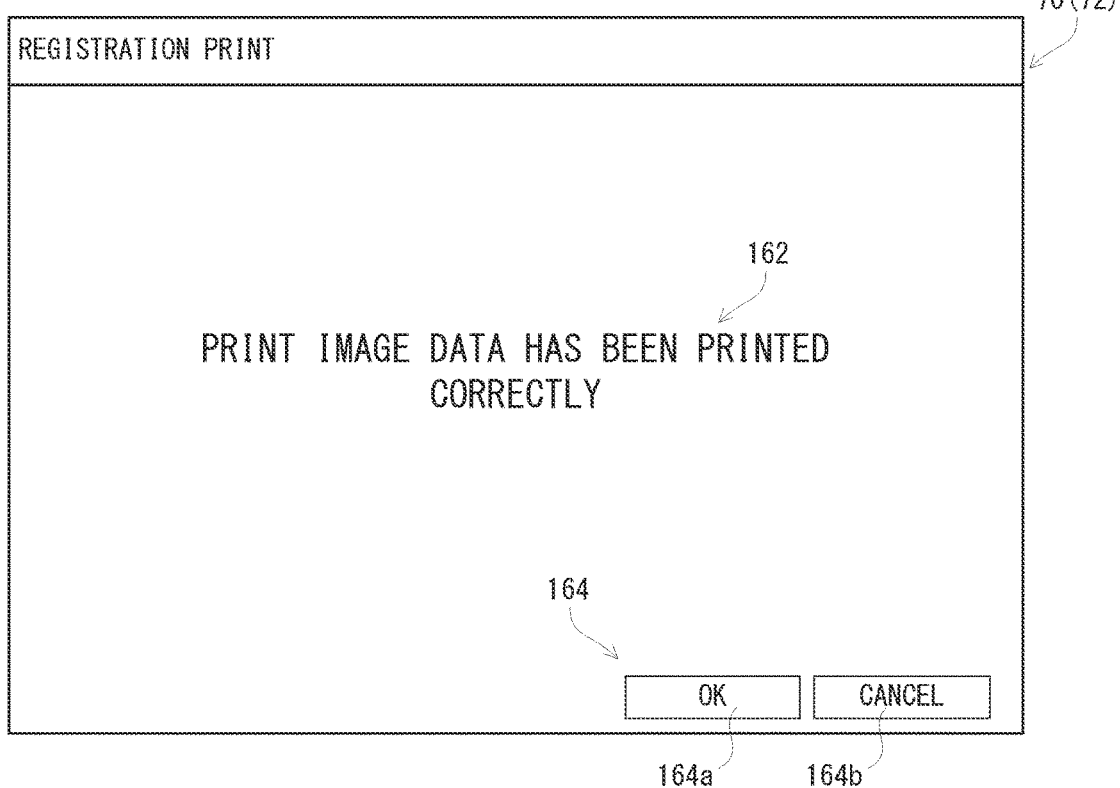
FIG. 13 is an illustration view showing an example of a notification screen in a second embodiment.

The child apparatus 12y for outputting notifies a user of the transmission result of the print image data when acquiring (receiving) the transmission result of the print image data. For example, as shown in FIG. 13, a notification screen 160 for notifying the user of the transmission result of the print image data is displayed on the display 72y. That is, the notification of the transmission result of the print image data is notified on the screen.

The notification screen 160 includes a notification text 162 and an indication portion 164. In addition, the indication portion 164 includes the OK icon 164a and the cancel icon 164b.

The notification text 162 is a message for notifying to the user that the print image data included in the print data for outputting has been transmitted to the transmission destination apparatus, and includes, for example, "The print image data has been transmitted correctly". In addition, instead of or in addition to the screen notification like the notification screen 160, voice notification that the print image data included in the print data for outputting has been transmitted to the transmission destination apparatus may be issued.

Moreover, in the second embodiment, in order to implement an operation as described above, the control program for the image forming apparatus includes a notification program for notifying the user of the transmission result of the print image data. The notification program includes a program for transmitting the transmission result of the print image data to the child apparatus 12y for outputting, a program for performing the screen notification and/or voice notification when the transmission result of the print image data is received, etc.

In the following, transmission processing and print processing in the second embodiment will be described using a flowchart; however, duplicate contents will be omitted or briefly described by applying the same reference numerals to the same processing as the transmission processing and the print processing described in the first embodiment.

Figure 14:
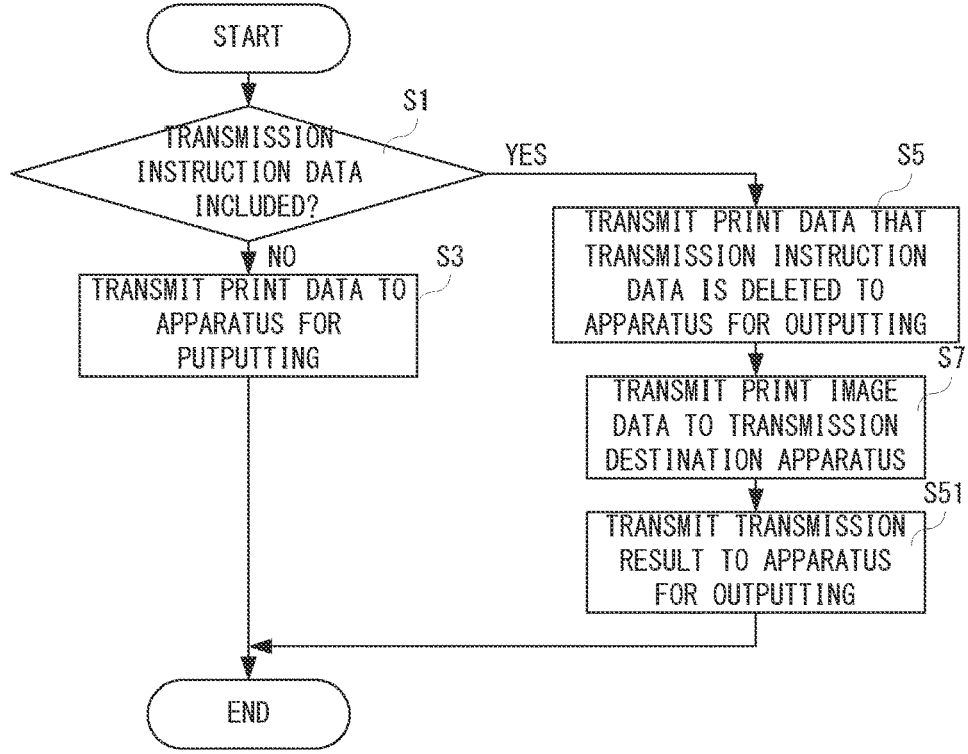
FIG. 14 is a flowchart showing an example of the transmission processing of the CPU of the image forming apparatus (parent apparatus) in the second embodiment.

FIG. 14 is a flowchart showing a part of an example of the transmission processing in the second embodiment. As shown in FIG. 14, if the transmission processing is started, the CPU 52x of the parent apparatus 12x transmits the print image data to the transmission destination apparatus in a step S7, and transmits transmission result data to the child apparatus 12y for outputting, and then, the transmission processing is ended.

In addition, since the contents of the processing up to the step S7 are the same as those of the first embodiment, duplicate description is omitted.

Figure 15:
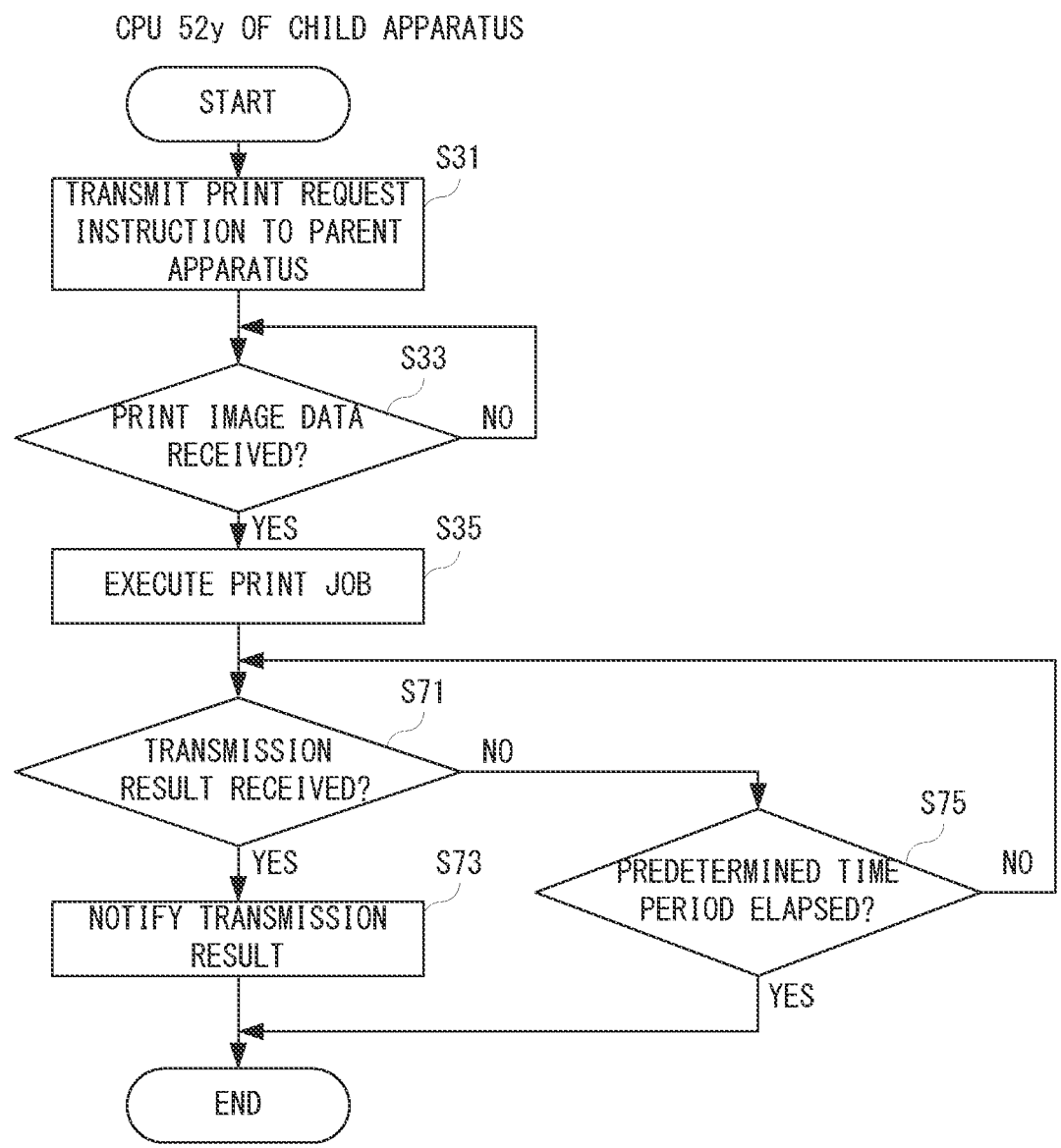
FIG. 15 is a flowchart showing an example of the print processing of the CPU of the image forming apparatus (child apparatus) in the second embodiment.

FIG. 15 is a flowchart showing a part of an example of the print processing in the second embodiment. As shown in FIG. 15, if the print processing is started, the CPU 52y of the child apparatus 12y executes the print job according to the print data in a step S35, and determines, in a step S71, whether the transmission result data is received. If "YES" is determined in the step S71, that is, if it is determined that the transmission result data is received, the transmission result data of the print image data is notified to the user in a step S73, and then, the print processing is ended.

On the other hand, if "NO" is determined in the step S71, that is, if it is determined that the transmission result data is not received, it is determined, in a step S75, whether a predetermined time period (for example, 30 to 120 seconds) elapses since the print job is started or the print job is ended. If "NO" is determined in the step S75, that is, if it is determined that the predetermined time period does not elapse, the process returns to the step S71. On the other hand, if "YES" is determined in the step S75, that is, if it is determined that the predetermined time period elapses, the print processing is ended.

In addition, since the contents of the processing up to the step S35 is the same as those of the first embodiment, the description is omitted.

According to this second embodiment, it is possible to make the user recognize the transmission result of the print image data, and therefore, convenience for the user can be further improved.

Although a third embodiment and a fourth embodiment according to the present invention will be described in the following, the third embodiment and the fourth embodiment use the image forming apparatus 12 and the information processing 14 respectively having the same or similar structure to those of the first embodiment and the second embodiment, and therefore, in the following description, duplicate description with the description of the first embodiment and the second embodiment will be omitted.

Third Embodiment

Moreover, also in the image forming system 10 of this third embodiment, a registration print function and a print data transmission function can be set as a function (print function) of a print job as described previously.

The print data transmission function in this third embodiment is a function that transmits the print image data based on the print data concerning the print job to a predetermined apparatus (a second external apparatus) when the print job is executed in an certain image forming apparatus 12. That is, the print data transmission function is a function that performs collectively a print and transmission of the print image data. The print image data may be transmitted by a facsimile communication or by an E-mail with being attached thereto.

The second external apparatus corresponds to the image forming apparatus 12 other than the image forming apparatus 12 that executes the print job, the information processing apparatus 14, other external apparatus capable of performing communication via the network 16, etc. Therefore, there is an occasion that the first external apparatus that is a transmission source of the print data and the second external apparatus that is a transmission destination of the print image data are the same apparatus. Designation of the second external apparatus by a user is performed in the information processing apparatus 14 by reading (acquiring) the address book (destination information table, see FIG. 8) of the image forming apparatus 12 that transmits the print data.

In the image forming system 10, if the print data transmission function is set, the print data including a command instructing to transmit (transmission instruction) the print image data to a predetermined second external apparatus is transmitted to the image forming apparatus 12. This transmission instruction includes ID information described on the address book and date and time information that the image forming apparatus 12 acquires the address book. A reason why the date and time information is included in the transmission instruction is for preventing erroneous transmission by preventing confusion with an address book owned by another image forming apparatus 12. The image forming apparatus 12 that receives the print data including transmission instruction executes the print job using the print image data generated based on the print data, and reads the destination information of the second external apparatus based on the ID information included in the transmission instruction with reference to the own address book, thereby to transmit the print image data to the destination (that is, designated second external apparatus).

Moreover, in the image forming system 10, if both of the registration print function and the print data transmission function are set, the print data including a save instruction and a transmission instruction to the second external apparatus is transmitted to the parent apparatus 12x. Although the ID information and the date and time information are included in this transmission instruction, these information are based on the address book of the parent apparatus 12x. Therefore, when receiving the print instruction from a user in a certain child apparatus 12y, even if the parent apparatus 12x transmits the print data to the child apparatus 12y as it is, the child apparatus 12y cannot execute the transmission processing (print data transmission function) of the print image data to the second external apparatus.

Therefore, in this third embodiment, in transmitting the print data to the child apparatus 12y from the parent apparatus 12x, the parent apparatus 12x transmits to the child apparatus 12y the print data by adding the destination information of the designated second external unit. That is, the destination information is made to be included in the transmission instruction. At this time, the ID information and the date and time information originally included in the transmission instruction may be deleted. The child apparatus 12y that receives the print data including the destination information executes the print processing using the print image data generated based on the print data, and transmits the print image data to that destination (i.e., the designated second external apparatus) utilizing the destination information included in the transmission instruction.

In addition, procedure of setting the registration print function and the print data transmission function in the GUI of the printer driver displayed on the display 36 of the information processing apparatus 14 that is an example of the first external apparatus is as having described previously.

Figure 16:
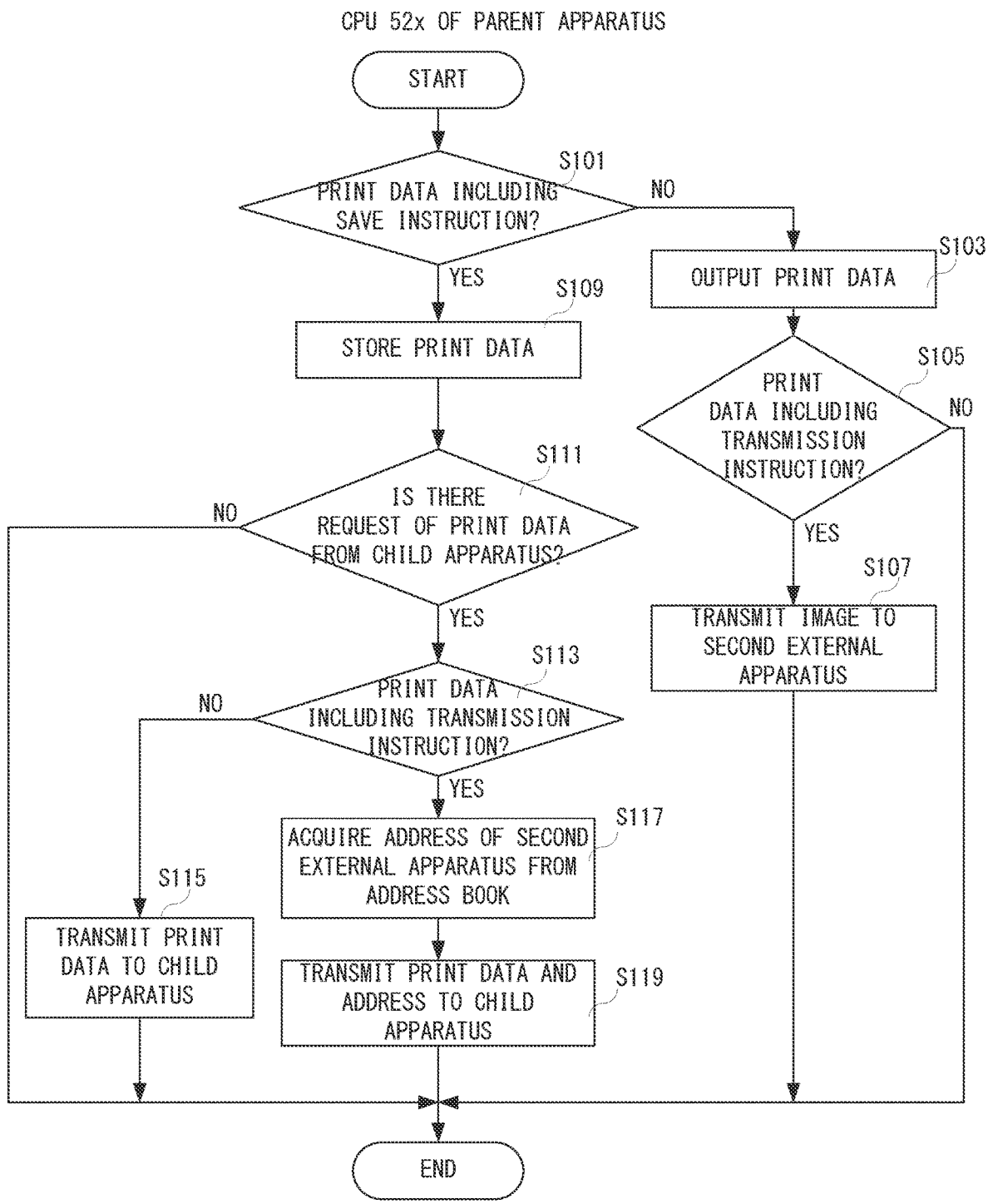
FIG. 16 is a flowchart showing an example of print transmission processing of the CPU of a first image forming apparatus (parent apparatus) in a third embodiment.

FIG. 16 is a flowchart showing an example of the print transmission processing (parent apparatus operation) executed by the CPU 52x of the parent apparatus 12x. In addition, the CPU 52x of the parent apparatus 12x functions as a first transmission determination unit and a first communication control unit, etc. in the present invention. This print transmission processing is started when the print data is received from the information processing apparatus 14.

As shown in FIG. 16, if the print transmission processing is started, the CPU 52x determines, in a step S101, whether a save instruction is included in the print data received from the information processing apparatus 14. That is, it is determined whether the registration print function is set.

If "NO" is determined in the step S101, that is, if the save instruction is not included in the print data, the received print data is output in a step S103. That is, the CPU 52x transmits a control signal to the image forming unit 62x etc. so as to form an image based on the print data on the recording medium. In a subsequent step S105, it is determined whether the transmission instruction is included in the received print data. That is, it is determined whether the print data transmission function is set. If "NO" is determined in the step S105, that is, if the transmission instruction is not included in the print data, the print transmission processing is ended. On the other hand, if "YES" is determined in the step S105, that is, if the transmission instruction is included in the received print data, image transmission to the designated second external apparatus is performed in a step S107. That is, the CPU 52x reads the destination information (email address, etc.) corresponding to the device ID included in the transmission instruction from the own address book (destination information table), and transmits the print image data based on the print data to the destination (the second external apparatus). When the processing of the step S107 is executed, this print transmission processing is ended.

On the other hand, if "YES" is determined in the step S101, that is, if the save instruction is included in the print data, the received print data is saved (stored) in the auxiliary storage 56x in a step S109. In a subsequent step S111, it is determined whether the print data is requested by the child apparatus 12y. If "NO" is determined in the step S111, that is, if there is no request of the print data from the child apparatus 12y, the print transmission processing is ended. On the other hand, if "YES" is determined in the step S111, that is, if the print data is requested by the child apparatus 12y, the process proceeds to a step S113.

In the step S113, it is determined whether the transmission instruction is included in the received print data. If "NO" is determined in the step S113, that is, if the transmission instruction is not included in the print data, after the print data is transmitted to the child apparatus 12y in a step S115, the print transmission processing is ended. On the other hand, if "YES" is determined in the step S115, that is, if the transmission instruction is included in the received print data, the destination information corresponding to the device ID included in the transmission instruction is read from the own address book in a step S117. In a subsequent step S119, the print data to which the destination information is added is transmitted to the child apparatus 12y. When the processing of the step S119 is executed, this print transmission processing is ended.

Figure 17:
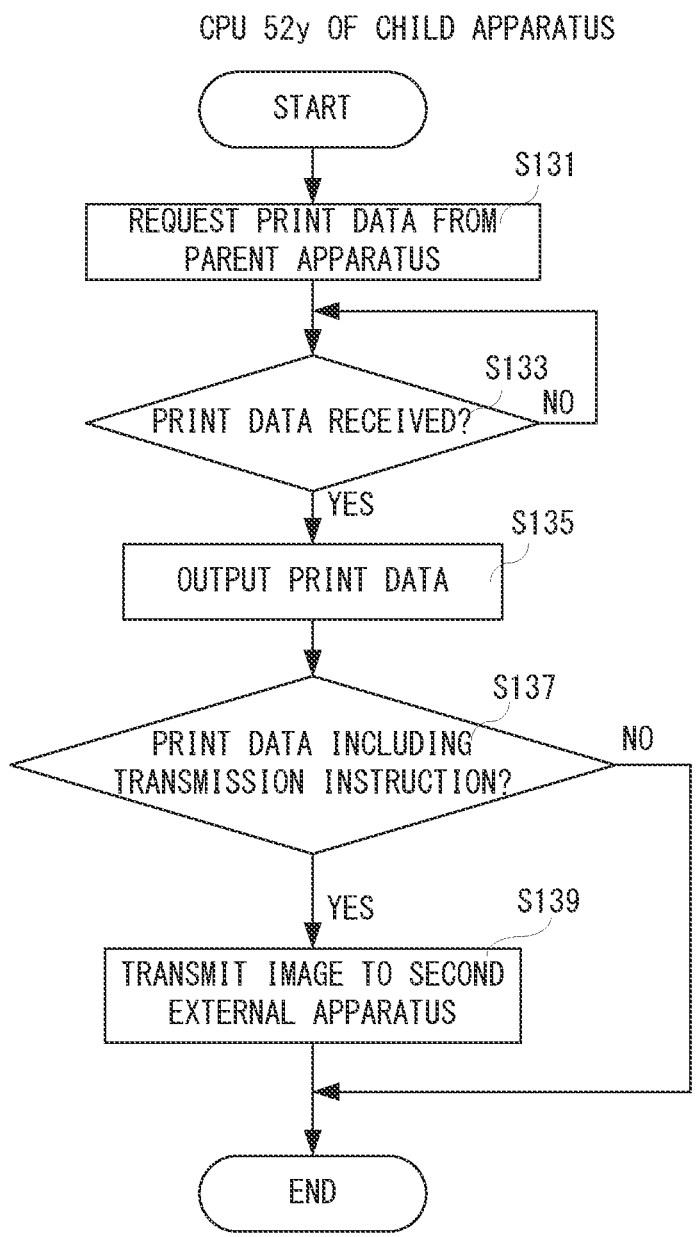
FIG. 17 is a flowchart showing an example of print transmission processing of the CPU of a second image forming apparatus (child apparatus) in the third embodiment.

FIG. 17 is a flowchart showing an example of the print transmission processing (child apparatus operation) executed by the CPU 52y of the child apparatus 12y. In addition, the CPU 52y of the child apparatus 12y functions as a second transmission determination unit and a second communication control unit in the present invention. The print transmission processing is started when an operation for print instruction untilizing the registration print function from the user is received by the input device 70y of the child apparatus 12y.

As shown in FIG. 17, if the print transmission processing is started, the CPU 52y requests the print data to the parent apparatus 12x in a step S131. In a subsequent step S133, it is determined whether the print data is received. If "NO" is determined in the step S133, that is, if the print data is not received, the process returns to the step S133. On the other hand, if "YES" is determined in the step S133, that is, if the print data is received, the received print data is output in a step S135. That is, the CPU 52y transmits a control signal to the image forming unit 62y etc., so as to form an image based on the print data on a recording medium.

In a subsequent step S137, it is determined whether the transmission instruction is included in the received print data. That is, it is determined whether the print data transmission function is set. If "NO" is determined in the step S137, that is, if the transmission instruction is not included in the print data, the print transmission processing is ended. On the other hand, if "YES" is determined in the step S137, that is, if the transmission instruction is included in the received print data, the image is transmitted to the designated second external apparatus in a step S139. That is, the CPU 52y transmits the print image data based on the print data to the destination (the second external apparatus) utilizing the destination information included in the print data. After execution of the processing in the step S139, this print transmission processing is ended.

As described above, in this third embodiment, when the transmission instruction to the second external apparatus is included in the print data received from the information processing apparatus 14, the parent apparatus 12x adds the destination information of the second external apparatus to the print data so as to transmit to the child apparatus 12y. The child apparatus 12y transmits the print image data to the second external apparatus utilizing the destination information added to the print data while forming an image on the recording medium based on the received print data.

Therefore, according to this third embodiment, by utilizing the print data that is transmitted from the information processing apparatus 14 based on the input operation by the user to be saved, it is possible to transmit the print image data to a desired second eternal apparatus at the same time as executing the print operation in the child apparatus 12y. That is, since the registration print function and the print data transmission function can be appropriately linked, the convenience of the user can be improved.

Fourth Embodiment

Next, an image forming system 10 of the fourth embodiment according to the present invention will be described. In the fourth embodiment, the processing after the child apparatus 12y transmits the print image data to the second external apparatus differs from that of the above-described third embodiment. Since except the above, the fourth embodiment is the same as the third embodiment, duplicate description will be omitted.

In the image forming system 10 of the fourth embodiment, the child apparatus 12y transmits (notifies) a transmission result (transmission result information) to the parent apparatus 12x after transmitting the print image data to the second external apparatus. The parent apparatus 12x saves (stores) the transmission result as a job log in the own auxiliary storage 56x when the transmission result is received from the child apparatus 12y. The user can know the transmission result of transmitting the print image data to the second external apparatus from the child apparatus 12y with reference to the job log of the parent apparatus 12x by accessing the parent apparatus 12x from the information processing apparatus 14. In addition, the transmission result to the second external apparatus by the child apparatus 12y is saved in the parent apparatus 12x, and can also be saved as a job log in the child apparatus 12y.

In the following, an example of the print transmission processing (child apparatus operation) executed by the CPU 52y of the child apparatus 12y in the fourth embodiment will be described using a flowchart of FIG. 18. However, since the contents of the processing from the step S131 to the step S139 are the same as those of the third embodiment, duplicate description is omitted.

Figure 18:
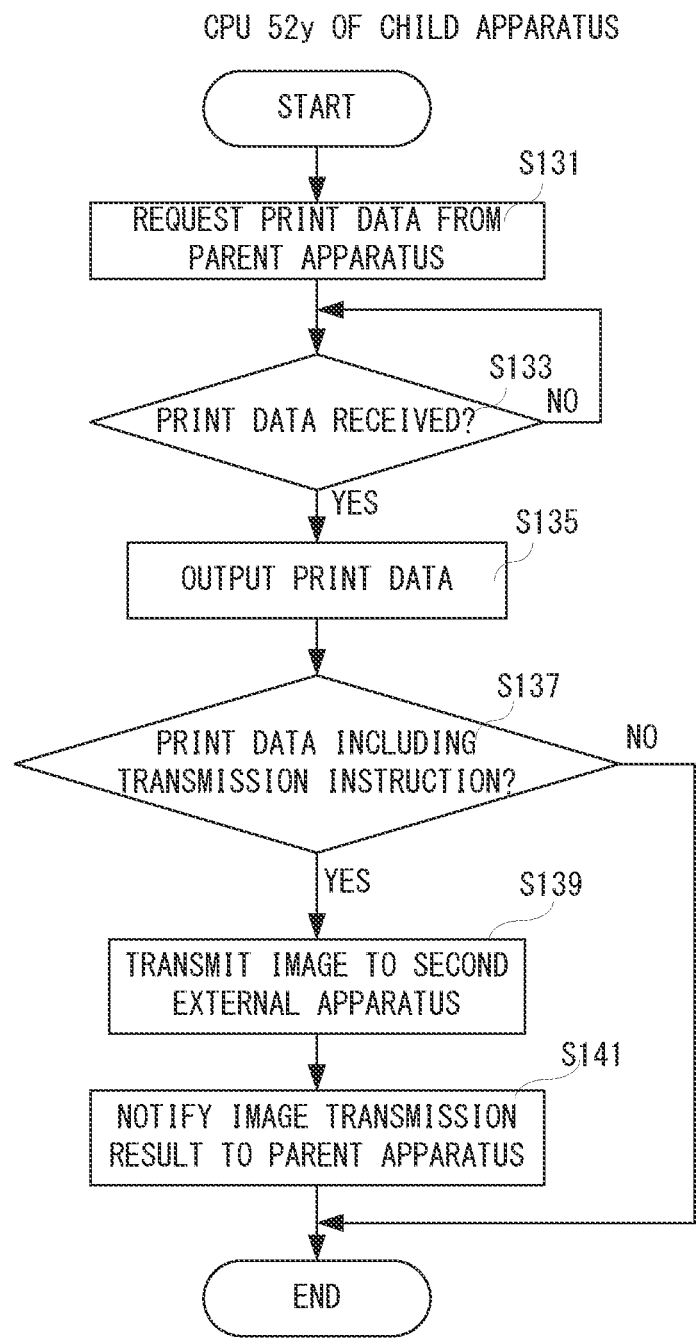
FIG. 18 is a flowchart showing an example of print transmission processing of the CPU of the second image forming apparatus (child apparatus) in an image forming system in a fourth embodiment according to the present invention.

As shown in FIG. 18, the CPU 52y of the child apparatus 12y transmits a result of the image transmission to the parent apparatus 12x in a step S141 after the step S139. For example, when the transmission of the print image data to the second external apparatus is completed, the transmission result indicating that the transmission is completed is transmitted, and when the transmission of the print image data to the second external apparatus is not completed even if a predetermined time period elaspes, the transmission result indicative of not having completed (i.e., occurring of transmission error) is transmitted. When the processing of the step S141 is executed, this print transmission processing is ended.

In addition, although illustration is omitted, the CPU 52x of the parent apparatus 12x saves (stores) the transmission result received from the child apparatus 12y in the auxiliary storage 56x.

According to the fourth embodiment, since the transmission result of the print image data in the child apparatus 12y can be confirmed by referring to the job log of the parent apparatus 12x, it is possible to further improve the convenience for the user.

In addition, specific configurations etc. described in the above-described embodiments are mere examples and can be appropriately changed according to actual products. Furthermore, as long as the same effect or result is obtained, an order of respective steps shown in the flow charts indicated in the above-described embodiments may be appropriately changed.

Although the present invention has been described and illustrated in detail, it is clearly understood that the same is by way of illustration and example only and is not to be taken by way of limitation, the spirit and scope of the present invention being limited only by the terms of the appended claims. Further, it is intended that the scope of the present invention includes meanings equivalent to the scope of claims and all the changes within the scope thereof.

What is claimed is:

1. An image processing apparatus, comprising:
a receiver that receives image data transmitted from an external apparatus;
a storer that stores destination information data of a predetermined transmission destination apparatus and the image data received by the receiver; and
a transmitter that transmits the image data to a further image processing apparatus when receiving a print instruction for the image data, wherein
the transmitter transmits, when transmission instruction data is included in the image data, the image data to the transmission destination apparatus.

2. The image processing apparatus according to the claim 1, wherein the image data transmitted to the transmission destination apparatus is still stored in the storer even after having been transmitted, and
the transmitter further transmits the image data that is still stored in the storer even after having been transmitted to one or more transmission destinations.

3. The image processing apparatus according to the claim 1, further comprising a deleter that deletes the transmission instruction data from the image data when the transmission instruction data is included in the image data,
wherein the transmitter transmits the image data from which the transmission instruction data is deleted by the deleter to the further image processing apparatus.

4. The image processing apparatus according to the claim 1, further comprising a notifier that notifies a transmission result to the further image processing apparatus when the transmitter transmits the image data to the transmission destination apparatus.

5. A control method that a computer of an image processing apparatus comprising a storage that stores destination information data of a predetermined transmission destination apparatus, executing:
receiving image data transmitted from an external apparatus;
storing the image data in the storage; and
transmitting the image data to a further image processing apparatus when receiving a print instruction for the image data, wherein
the image data is transmitted to the transmission destination apparatus when transmission instruction data is included in the image data.

6. The control method according to the claim 5, wherein storing the image data transmitted to the transmission destination apparatus in the storer even after having been transmitted, and
further transmitting the image data that is still stored in the storer even after having been transmitted to one or more transmission destinations.

7. The control method according to the claim 5, further deleting the transmission instruction data from the image data when the transmission instruction data is included in the image data, wherein
the image data from which the transmission instruction data is deleted in the deleting is transmitted to the further image processing apparatus.

8. The control method according to the claim 5, further notifying a transmission result to the further image processing apparatus when transmitting the image data to the transmission destination apparatus.

\* \* \* \* \*